(12) United States Patent
Kendall et al.

(10) Patent No.: US 10,295,411 B2
(45) Date of Patent: May 21, 2019

(54) CONSUMABLE OPTICAL FIBER FOR MEASURING A TEMPERATURE OF A MOLTEN STEEL BATH

(71) Applicant: Heraeus Electro-Nite International N.V., Houthalen (BE)

(72) Inventors: Martin Kendall, Zonhoven (BE); Robert Charles Whitaker, Chesterfield (GB); Marc Straetemans, Hechtel-Eksel (BE); Jack Childs, Workshop (GB); Dominique Feytongs, Hasselt (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 215 days.

(21) Appl. No.: 15/291,146

(22) Filed: Oct. 12, 2016

(65) Prior Publication Data
US 2017/0146408 A1    May 25, 2017

(30) Foreign Application Priority Data
Oct. 14, 2015    (GB) .................................... 1518208.2

(51) Int. Cl.
*G01J 5/08*        (2006.01)
*G01J 5/00*        (2006.01)
*G02B 6/44*        (2006.01)

(52) U.S. Cl.
CPC ............ *G01J 5/004* (2013.01); *G01J 5/0821* (2013.01); *G02B 6/4433* (2013.01); *G02B 6/4436* (2013.01)

(58) Field of Classification Search
CPC .................. G01J 5/004; G02B 6/4432–6/4433
See application file for complete search history.

(56) References Cited

U.S. PATENT DOCUMENTS 3,943,271 A * 3/1976 Bander ................ H01B 7/2813
                                                                174/102 D
5,585,914 A   12/1996 Yamasaki et al.
(Continued)

FOREIGN PATENT DOCUMENTS

CN        1109970 A      10/1995
CN      201570288 U       9/2010
(Continued)

OTHER PUBLICATIONS

Office Action dated Mar. 6, 2018 in Taiwanese Application No. 105130493.
(Continued)

*Primary Examiner* — Clayton E. LaBalle
*Assistant Examiner* — Leon W Rhodes, Jr.
(74) *Attorney, Agent, or Firm* — Panitch Schwarze Belisario & Nadel LLP

(57) ABSTRACT

An optical cored wire includes an optical fiber and a cover laterally surrounding the optical fiber. The cover surrounds the optical fiber in a plurality of layers. One layer is a metal coat, also called a metal jacket or a metal tube. An intermediate layer, also called filler, is arranged beneath the metal tube. The intermediate layer is formed from a thermal insulating material having a melting point in the temperature ulnae of 1000° C. to 1500° C., such that the pieces of the intermediate layer are fluid upon exposure to the molten metal temperatures and a portion of the intermediate layer, the entire intermediate layer and/or the cover laterally surrounding the optical fiber can melt immediately upon immersion into the molten metal or immediate exposure to the molten metal.

21 Claims, 5 Drawing Sheets

(56) References Cited

U.S. PATENT DOCUMENTS

| | | | |
|---|---|---|---|
| 5,730,527 | A | 3/1998 | Takayama et al. |
| 5,988,545 | A | 11/1999 | King |
| 6,004,031 | A | 12/1999 | Takayama et al. |
| 6,770,366 | B2 | 8/2004 | Riche et al. |
| 6,901,192 | B2 * | 5/2005 | Wells .................. G02B 6/4432 385/103 |
| 7,748,896 | B2 | 7/2010 | Dams et al. |
| 7,906,747 | B2 | 3/2011 | Poulalion |
| 7,936,957 | B1 * | 5/2011 | Puzan .................. G02B 6/4433 385/105 |
| 2005/0175065 | A1 | 8/2005 | Coleman |
| 2007/0268477 | A1 | 11/2007 | Dams et al. |

FOREIGN PATENT DOCUMENTS

| | | |
|---|---|---|
| CN | 201570315 U | 9/2010 |
| DE | 3707322 C1 | 6/1988 |
| DE | 3712619 A1 | 10/1988 |
| DE | 19623194 C1 | 7/1997 |
| DE | 19916235 A1 | 9/2000 |
| EP | 0107796 A1 | 5/1984 |
| EP | 0526081 A1 | 2/1993 |
| EP | 0 655 613 A1 | 5/1995 |
| EP | 0806640 A2 | 11/1997 |
| EP | 1050913 B1 | 1/2007 |
| JP | S56132302 A | 10/1981 |
| JP | S6052507 A | 3/1985 |
| JP | H08-15040 A | 1/1996 |
| JP | H-09101206 A | 4/1997 |
| JP | H09-243459 A | 9/1997 |
| JP | H09-304185 A | 11/1997 |
| JP | H 10176954 A | 6/1998 |
| JP | H11-160155 A | 6/1999 |
| JP | 2000121446 A * | 4/2000 |
| TW | 201506366 A | 2/2015 |
| WO | 02099493 A1 | 12/2002 |
| WO | 2011081653 A1 | 7/2011 |

OTHER PUBLICATIONS

E.B. Shand, Engineering Glass, Modern Materials, vol. 6, Academic Press, New York, 1968, pp. 247-317.

Search Report dated Mar. 15, 2016 in GB Application No. 1518208.2.

Lamp et al., "Innovative Continuous Online Determination of Steel Melt Temperature by Direct Optical Measurement in the Melt", European Commision Technical Steel Research, 9 pgs (2005) (cited in Specification).

Extended Search Report dated Mar. 8, 2017 in EP Application No. 16185902.0.

Fibre Optic Cable Catalogue, FibreFab, Version 7.11, 2011, downloaded from web page: https://www.hik-consulting.pl/shop/files/kable_swiatlowodowe_katalog.pdf, Download date: Feb. 14, 2017, 42 pages.

ManniGlas 1200, Lydall, downloaded from webpage: URL:http://www.fabricationspecialties.com/pdf/ManniGlas1200.pdf, Downloaded Feb. 15, 2017.

Office Action dated Dec. 5, 2018 in CN Application No. 201610894380.7.

* cited by examiner

|  | E | A |
|---|---|---|
| SiO$_2$ | 56.99 | 43-74 |
| B$_2$O$_3$ | 6.12 | 0-8.5 |
| Al$_2$O$_3$ | 8.78 | 6-10 |
| MgO | 6.5 | 0.5-9 |
| CaO | 19.64 | 15-28 |
| Na$_2$O | 0.61 | 0-2.5 |
| K$_2$O | 0.00 | 0-0.5 |
| Fe$_2$O$_3$ | 0.13 | 0-0.3 |
| TiO$_2$ | 0.44 | 0-1 |
| F | 0.70 | 0-2 |

| C | % |
|---|---|
| SiO₂ | 52.8 |
| Al₂O₃ | 17.5 |
| Fe₂O₃ | 10.3 |
| MgO | 4.63 |
| CaO | 8.59 |
| Na₂O | 3.34 |
| K₂O | 1.46 |
| TiO₂ | 1.38 |
| P₂O₃ | 0.28 |
| MnO | 0.16 |
| Cr₂O₃ | 0.06 |

CONSUMABLE OPTICAL FIBER FOR MEASURING A TEMPERATURE OF A MOLTEN STEEL BATH

BACKGROUND OF THE INVENTION

The present invention relates to a consumable cored wire comprising an optical fiber surrounded by a cover for measuring a temperature of a molten steel bath.

JPH0815040 (A) describes a method involving feeding a consumable optical fiber into liquid metal for measuring the temperature of molten metal baths, A similar method and apparatus for optical fiber measurements of molten metals is also described in U.S. Pat. No, 5,730,527. Consumable optical fibers of this kind are known, for example, from JPH111160155 (A). These early consumable optical fibers are single metal jacketed optical fibers in which the optical core is provided with a metal covering, typically stainless steel, that serves the purpose to stiffen the optical fiber such that it can be immersed into molten metal. Whereas these immersible optical fibers can penetrate beneath the molten surface, they also suffer from a rapid deterioration.

Improvements to these early consumable optical fibers comprise additional protection structures and are known, for example, from JH10176954 (A). In JPH10176954 (A), the optical fiber is surrounded by a protective metal tube which is surrounded by an additional layer of plastic material. This covered consumable optical fiber, winch is immersible into the molten metal, is fed from a coil or spool at a predetermined rate that would expose the tip of the optical fiber to the metal when deeply immersed. The depth of immersion at the time of exposure is important for temperature accuracy. Therefore, preventing early destruction or moving the optical fiber tip to the measuring point quickly are necessary for accurate temperatures. JPH09304185 (A) discloses a feeding rate solution where the speed of fiber consumption must be greater than the rate of devitrification, thereby assuring that a fresh optical fiber surface is always available.

Since heat from any source degrades the fiber, the fiber should be protected from heat gain just prior to immersion. Likewise, the remaining unused portion must also be protected from heat gain after a measurement to be suitable for the next measurement.

U.S. Pat. No. 5,585,914 teaches that a consumable optical fiber can be fed through a nozzle into a molten metal at a rate of 5 mm/sec for 10 seconds, then held as immersed for 20 seconds. When accomplished in a cyclical fashion, this process can be considered continuous. JPH09304185 (A) teaches that for accurate results, the rate of destruction and subsequent exposure of a new surface must correspond to the speed at which the vitreous structure of its tip is destroyed. That is, new fiber material is constantly fed to replace devitrified fiber and is thus suitable for receiving and passing on radiation, without radiation losses.

To accomplish this replacement, the fiber is fed into the molten metal until its temperature response exceeds a set point. The feeding is stopped for two seconds and a first temperature is determined. The fiber is then fed again into the metal for 10 mm and stopped for two seconds, and a second temperature is determined. A comparison of the first and seconds temperatures determines if a successful measurement has been achieved or if additional cycles are needed. Besides for a means to determine if the reading is acceptable, the speed of feeding is not specified.

Additionally, since steelmaking is a batch process, the above prior art suffers from the fact that a prior measurement using the remaining portion of coiled optical fiber will be devitrified. Therefore, one cannot follow this method since the initial determination of the set point temperature of the next measurement cannot be adequately determined. JPH09243459 (A) teaches a corrective action in that damaged consumable optical fibers should be cut away from the supply coil each time to provide an un-devitrified fiber. Yet, this prior art reference provides no indications of how one is to determine the extent of devitrification.

In practice, this requires additional equipment to cut away the damaged portion of the fiber and, in the case where the immersion is from above the metal, the fiber must be withdrawn through a layer of slag which may collect on the fiber, thus interfering with the removal from the vessel and the cutting mechanism.

A variety of schemes to feed consumable optical fiber all are designed to expose the optical fiber core to the molten metal before devitrification. However, the devitrification rate is dependent upon the actual conditions of the molten metal, such as its temperature, its motion, the containment vessel and the slag covering the bath, as well as the thermal conditions that the optical fiber is exposed to before and after each measurement cycle.

It has been found that since the availability of a fresh fiber surface is essential for an accurate temperature measurement and since this availability depends upon how the fiber is immersed into the molten metal, multiple feeding schemes are likely to arise due to the numerous variety of conditions that the fiber will be exposed to when immersed into and through various metallurgical vessels at various times during metals processing.

When variation in the rate of devitrification can be minimized by improvement in the consumable optical fiber construction, the applicability of the measuring technique can apply to a wider range of metallureical vessels without customization of the feeding regime.

Multi-layered wire structures with a steel outer covering are used in steelworks to introduce doping substances selectively into the molten steel bath. These are typically called cored wires and are described in DE19916235A1, DE3712619A1, DE19623194C1 and U.S. Pat. Nos. 6,770,366, 7,906,747 discloses a cored wire comprising a material which pyrolizes upon contact with a liquid metal bath.

U.S. Pat. No. 5,988,545 discloses a cored wire injection system where cored wires are supplied in coils or on spools, such as for integration with special wire feeding machines, such as disclosed in EP 0806640, JPH09101206 (A), JPS6052507 (A) and DE3707322 (C1), to carry out the practical immersion of the cored wire.

U.S. Pat. No. 7,748,896 discloses a device for measuring a parameter of a molten bath. The device comprises an optical fiber, a cover laterally surrounding the optical fiber, and a detector connected to the optical fiber, wherein the cover surrounds the optical fiber in a plurality of layers, one layer comprising a metal tube and an intermediate layer arranged beneath the metal tube, the intermediate layer comprising a powder or a fibrous or granular material, wherein the material of the intermediate layer surrounds the fiber in a plurality of pieces.

The intermediate layer is formed of silicon dioxide powder or aluminum oxide powder and may contain a gas producing material. The disclosed feature of the intermediate layer surrounding the fiber in a plurality of separate parts means, in the sense of the invention, that the construction in multiple parts exists in the operating state (i.e., during or after immersion in the molten bath to be measured), such that the pieces of the intermediate layer remain separate and are separable during use. The addition of a gas producing material aids in the explosive separation of the parts of the intermediate layer.

While the parts are contained within the un-melted outer metal jacket, this optical cored wire structure aids in keeping the optical fiber at its center at a very low temperature for a relatively long time. Denitrification from elevated temperatures that will destroy the optical fiber is delayed. From a particular temperature onwards during immersion into molten metal, expansion of the gases of the intermediate layer forcibly remove the un-attached cover layers.

The fiber is heated erratically to the equilibrium temperature in the molten metal bath, so that the measurement can then take place very quickly before the optical fiber or its end immersed in the molten metal bath is devitrified. This unpredictability of the explosive nature of the gas evolution to reveal a fresh optical surface, provides erratic results which are subject to interpretation and misreading of the correct temperature.

According to the known requirement of accurate temperature measurements by immersed optical fiber, the optical fiber must be consumed at a rate which is equal to or faster than the rate of devitrification of the optical core. Since the rate of devitrification is both a function of the amount of heat input to the optical core during its molten metal immersion and heat input to the optical core from exposure to the environment surrounding the cored optical fiber, the fiber must be allowed to be consumed in proportion to pre-exposure conditions, such as the radiant heat at the immersion location, the slag temperature as well as the melt temperature of the particular furnace.

An objective of the present invention is to further improve the measuring of the temperature in a molten steel bath by an improved cored wire.

BRIEF SUMMARY OF THE INVENTION

The present invention relates to a cored wire for measuring a temperature of a molten metal comprising an optical fiber and a cover laterally surrounding the optical fiber. The cover surrounds the optical fiber in a plurality of layers, one layer comprising a metal tube and an intermediate layer arranged beneath the metal tube. The intermediate layer, the entire intermediate layer and/or the cover laterally surrounding the optical fiber can melt immediately upon immersion into or immediate exposure to the molten metal.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

The present invention relates to a cored wire for measuring a temperature of a molten metal comprising an optical fiber and a cover laterally surrounding the optical fiber. The cover, surrounds the optical fiber in a plurality of layers, one layer comprising a metal tube and an intermediate layer arranged beneath the metal tube. The intermediate layer, the entire intermediate layer and/or the cover laterally surrounding the optical fiber can melt immediately upon immersion into or immediate exposure to the molten metal.

Figures 7, 8:
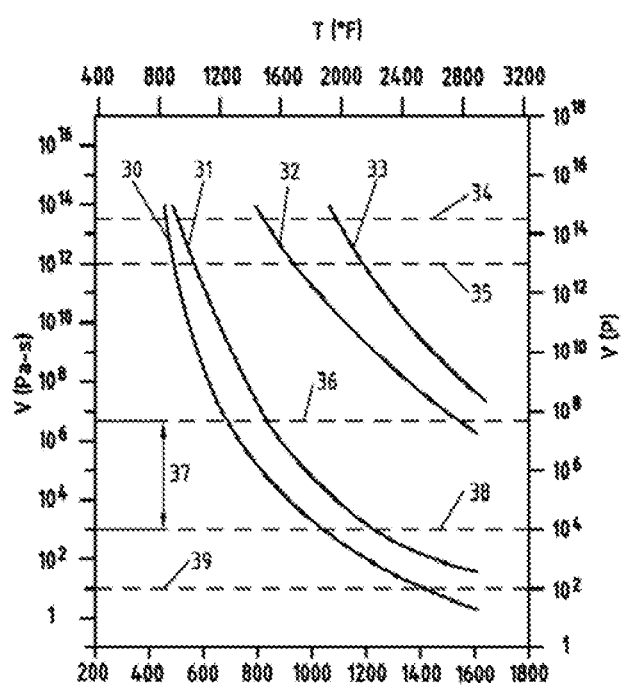
FIG. 7 shows composition of basalt rock from which basalt glass is made.
FIG. 8 is a plot of glass viscosity verses temperature for select glasses.

The term "melt" or "melting" for materials other than metals with a distinct melting temperature refers, within the scope of this application, to a material condition, which is fluid. enough to readily flow under its own weight or pushed by the weight of another liquid such as opposing liquid metal. Glass material can thus be particularly described as "molten" having a viscosity of 10 to 10,000 poise, preferably 10 to 1000 poise. FIG. 8 shows the viscosity of glass material over temperature.

"Immediately upon immersion" means at the time of direct contact with molten metal. However, when the entire intermediate layer comprises metal, "immediately upon immersion" includes the time of heating up such metal components to melting temperature to become fluid. In the latter case, "immediately upon immersion" implies that such metal components are few and small enough to melt immediately, for example, in less than a second.

For the below reasons, reliable measurement can thereby be achieved by the present invention.

In one embodiment, the cored wire has an immersion side for immersion into the molten metal and an opposite side, wherein the intermediate layer is composed in such a way that the intermediate layer is molten during immersion into the molten metal at the immersion side and, at the same time, remains unmelted and/or porous at the opposite side.

Having a cored wire with an immersion side, where the intermediate layer can melt during immersion, and an opposite side with an unmelted intermediate layer, the optical fiber can be well protected by the intermediate layer for a reliable measurement. The unmelted and/or porous intermediate layer can provide good insulation of the optical fiber.

In one embodiment, the optical fiber is arranged centrally in the cored wire and/or covered by a tube or sheath of plastic. An effective protection of the optical fiber can thereby be achieved.

In one embodiment, the cored wire comprises an, intermediate layer with a lower, melting point than the metal, preferably less than 90% or 50% to 85% of the melting point of the metal, wherein the temperature of the melting point is measured in ° C.

The term "melting point" within the scope of this application shall be understood in the above-described meaning of "melting" for non-metals and not interchanged with melting points or melting temperatures sometimes suggested, for example, for glass materials. The "melting point" of FIG. 8 at 100 poise is therefore not a melting point for glass within the meaning of the present application.

A stationary condition of protecting a gob of molten intermediate layer, and thus a reliably measurement, can thereby be achieved.

In one embodiment, the intermediate layer can form a gob of molten intermediate layer in a stationary condition surrounding the optical fiber during measuring.

Stationary condition means that the liquid gob around the optical fiber remains despite material outflow and inflow, such that excess molten gob material is leaving the gob while new gob material for substituting the material loss is resupplied by the melting cover laterally surrounding the optical fiber and/or the melting intermediate layer.

Reliable measurement with a continuously renewing optical fiber with reduced disturbances due to surrounding cover can be achieved.

In one embodiment, the intermediate layer can provide an unmelted density as weight divided by porous structure volume, which is at least 30% higher and/or at most 100% higher than a melted density as the weight divided by conglomerated molten material volume.

To illustrate the meaning of unmelted and melted density, a ball of glass wool may serve as an example. A ball of glass wool is a very light and fluffy material, even though the physical property of the glass making up the wool is a high viscosity liquid material. The light and fluffy material occupies a volume and if one takes the weight and the volume of this glass wool ball, the unmelted density can be calculated. After heating the same glass wool up to its glassmaking melting temperature, it will flow like a liquid. The glass wool will collect upon itself and form a puddle of glass. The volume that the puddle occupies and the weight which is the same as the weight of the starting glass wool ball are divided to calculate the melted density. These are two different densities, but they arise from the state of the intermediate layer before and/or during use.

The melted density is that of the gob formed at the optical fiber projection or tip surface of the optical fiber. The gob has an interface which contacts the steel and this interface is liquid to liquid. The opposite gob interface is a liquid to solid interface and it contacts the unmelted intermediate layer that feeds the liquid gob with newly melted material.

An unmelted density of at least 30% higher and/or at most 100% higher than the melted density enables reliable measurement results. This ratio is important because the intermediate layer is insulating when unmelted to protect the unused optical fiber. The intermediate layer can thus change from unmelted to melted density during use when the intermediate layer is exposed to molten metal, and collects upon itself particularly under its own surface tension and the action of the molten metal pushing upon it. The higher density in the metal promotes a good thermal exchange with the optical fiber and helps to carry away an excess molten gob and devitrified optical fiber while exposing a new surface.

In one embodiment, the intermediate layer has a melted density, which corresponds to at least 15% and/or at most 60% of 7 g/cm$^3$ or common melted metal density.

The density of the molten intermediate layer verses 7 g/cm$^3$ or that of molten steel in the range of at least 15% and/or at most 60% is relatively constant for molten metals since, for example, all silica based glasses particularly with alkali earth silicate (AES) and steel are still in narrow band with respect to the variation in density ratio. For example, both molten glass and molten metal density vary in the same direction with respect to temperature.

The intermediate layer can consist of 100% E-glass, 100% basalt glass or a mixture of 33% AES and 66% E-glass. Reliable measurement can thereby be achieved.

In one embodiment, a rate of removal of the gob of molten intermediate layer from a surface of an optical fiber projection can depend on a density difference between the liquid gob and the liquid molten metal.

The optical fiber projection is the tip of the optical fiber which generally is protruding at the immersion side from the cored wire during measurement.

The rate of removal of the gob refers to the amount of excess molten gob leaving the gob over a period of time. Removal of gob from the tip surface is a function of the difference in density between liquid gob and liquid metal and, as such, is repeatable in practice since the ratio has low variation in practice. It generally applies for metal, steel, iron, copper etc.

The gob can thereby get replenished from the melting of the intermediate layer, and thus a consuming cored wire can maintain a relative sized gob always replenishing the excess molten gob material that has flowed away.

In one embodiment, the cored wire or the metal tube is not gas tight particularly by means of a lap seam, or is gas tight particularly by means of a lock seam, for example a countersunk lap seam or grooved flat lock seam.

The metal tube generally refers to an outer metal jacket or outer metal coat. The density of the munched intermediate layer or layers provides for open porosity behind the molten gob during measurement.

The cored wire or the metal tube can be designed to be not gas tight, preferably by a lap seam with little production expenditures. Such not gas tight design or providing a lap seam will enable gas in the internal structure of the cored wire to move away from the gob inside the metal tube through the porous intermediate layer and also through the seam.

Alternatively, the cored wire or the metal tube can be designed to be gas tight, preferably with a lock seam with little production expenditures, enabling the same gas movement through the internal structure of the cored wire but not away from the gob by exit through the seam.

The present invention also independently concerns a cored wire comprising an optical fiber and a cover laterally surrounding the optical fiber. The cover surrounds the optical fiber in a plurality of layers. One layer is a metal coat, also called a metal jacket or a metal tube. An intermediate layer, also called filler, is arranged beneath the metal tube. The intermediate layer is formed from a gas porous thermal insulating material having a melting point of at least 600° C. or at least 1000° C. and/or at most 1500° C. preferably 1000° C. to 1400° C. more preferably 1200° C. to 1400° C., such that the pieces of the intermediate layer are fluid upon exposure to the molten metal temperatures.

An optical fiber is a flexible, transparent fiber. Optical fibers are used most often as a means to transmit light between the two ends of the fiber. An optical fiber may be formed from glass or plastic. The material of the intermediate layer maybe E-glass, borosilicate glass, basalt alkaline earth silicates, and/or a mixture of these glasses. The metal coat the metal jacket) may be formed from a strip of metal 0.5 to 1.5 mm thick, preferably 1.0 mm thick with a Fe content greater than 50%, preferably low carbon steel and may be formed into a tube with a lap seam. The seam is particularly mechanically formed, and not sealed by adhesive or glues.

An appropriate time for utilization of this device is near the end of the relining process, where the temperature of a steel bath is about 1600° C. When the cored wire arrives at the molten steel bath, the metal tube will melt and dissolve into the metal bath, since the melting point of the intermediate layer material is much lower than the temperature of the molten steel bath.

The intermediate layer will particularly melt to form a gob with a liquid interface against the liquid metal.

A gob generally means a mass of molten material, such as glass or metal.

Parts of the gob will flow away immediately afterwards due to the melting point of the intermediate layer material being much lower than the temperature of the molten steel bath.

One will appreciate that fused materials, such as the glasses of the intermediate layer, do not experience a distinct melting point as crystalline materials do, but soften over a fairly broad temperature range. This transition from a solid to a plastic-like behavior, called the transformation range, is distinguished by a continuous change in viscosity with temperature. Thus, in the scope of the present invention, the term melt as applied to the intermediate layer is used to encompass the temperature range where the material is fluid enough to readily flow under its own weight or pushed by the weight of an opposing liquid metal.

This is a function of the glass chemistry and preferably a glass chemistry that at the temperature of use will generally result in a glass viscosity between 10 and 103 poise. The relationship of logarithm viscosity and temperature is known from E. B. Shand, Engineering Glass, Modern Materials, Vol. 6, Academic Press, New York, 1968. p. 262.

It has been found that by fusing the material of the intermediate layer, a molten gobular layer of material surrounds the optical fiber providing an initial protection, and then will flow away from the optical fiber at a predictable rate which is a function of its molten viscosity and the difference in density between it and the molten steel. In a practical sense, the difference in densities of the molten metal bath and the molten gob formed from the intermediate layer, although both are a function of temperature and composition, are relatively constant within the application range.

Up until the time the optical cored wire is immersed, the central optical fiber is thermally insulated and protected by the relative low density of the unmelted intermediate layer, until the outer metal jacket melts away exposing the filler (i.e., intermediate layer) which subsequently melts and pools around the optical fiber. Since the melting temperature of the tiller (i.e., intermediate layer) is generally substantially lower than the molten metal temperature once exposed guarantees that it will always be in a molten, fluid state. The progressive melting of the intermediate layer can form a molten gob surrounding the optical fiber.

The formation of a gob creates a liquid to liquid interface with the molten metal and, at the same time, a liquid to solid interface opposite the molten metal. The volume of an accumulating gob surrounding the optical fiber is limited by the density driven fluid forces acting upon its molten mass, and its surface tension. Any excess volume flows away from the liquid to liquid interface and is progressively resupplied at the liquid to solid interface, such that a stationary condition of a gob of molten intermediate layer surrounding the optical fiber can be reached. Thus, the volume of molten glass material at the tip of the melting optical cored wire is relatively constant.

It has become apparent that the variation between the density of the steel and that of the molten gob results in a more predicable mechanism for exposing and renewing the fresh optical surface. The upward force of the displaced metal on the molten material of the intermediate layer (i.e., filler material) pushes the molten gob back and away from the optical fiber which stands extended from the gobular filler and forms a projection. Without a reinforcing inner metal jacket as in the prior art, this projecting fiber is substantially weak. As the feeding progresses, a sufficient quantity of molten filler accumulates at the base and a portion of this quantity is dragged with the extended optical core into the molten metal until the upward force of the molten metal upon the accumulated gob fractures the optical fiber at its base.

The rate of un-devitrified optical fiber exposed to the molten metal is therefore more dependent upon the nearly constant density ratio-gob/molten steel, and the depth of immersion thus allows a wide tolerance for the rate of feed. It has been found that retraction of the molten gob from the advancing optical fiber tip projection leads to more repeatable detection opportunities.

By providing the intermediate layer being formed from a gas porous thermal insulating material having a melting point in the temperature range of 600° C. to 1500° C. or 1000° C. to 1500° C., preferably at 1200° C. to 1400° C. the violent "explosion" and expansion of U.S. Pat. No. 7,748,896 and U.S. Patent Application Publication No. 200710268477 A1 can be eliminated and replaced by a more controllable exposure of the fiber to the bath.

In a preferred embodiment, the intermediate layer is formed from fibers. Fibers cannot discharge from the cored wire in advance like particles, when the cored wire is fed into the melt. A discharge prior to the arrival at the melt would reduce the thermal isolation for the optical fiber which would reduce the reliability of measurement results. No adhesive or resin is necessary for sticking the filler material together, which eliminates the presence of materials that would have the potential for explosive gasification.

In a preferred embodiment, the fibers are endless fibers. This facilitates reliability of the measurement. Further, endless fibers facilitate the production of the intermediate layer.

In a preferred embodiment, a rope forms the intermediate layer. In general, a rope is a group of fibers, which are twisted or braided together in order to combine them into a larger and stronger form. In the classical sense of the word, a rope is particularly composed of fibers that are collected into a yarn and multiple yarns can be collected into a strand, of which several strands can be collected into a rope. The use of the word rope of the present invention should be taken in its broadest sense where it represents a general structure and maybe formed of a grouping of yarns and/or a grouping of strands, twine cords and the like forming a generally rope-like shape.

The rope maybe of a single chemical composition. Thus, the un-fused density, i.e. weight divided by volume of an arrangement of un-fused parts such as fibers, of an intermediate layer formed of a twisted or braided rope is a controllable function of the number of and thickness of, the individual yarns/strands comprising the agglomerated form. More exactly, the resultant fused volume in relation to the starting volume per linear unit of rope is well controlled.

This also avoids the above-mentioned discharge problem in a more reliable manner and comes with good thermal isolation properties. As a result, the reliability of the measurement is further improved.

In a preferred embodiment, the optical fiber is arranged in the center of the rope, which further improves the quality and the reliability of the measurement results.

In a preferred embodiment, the rope or strands of the rope are volumized. A strand, as well as a rope within the meaning of the present invention, is composed of a plurality of fibers. A volumized rope or strand are treated in such a way, sometimes called texturizing, to have fibers irregularly oriented out of the fabric plane. The fibers or strands can be drawn through a nozzle in which an airstream creates turbulence in order to volumize the rope or the strand. Volumizing the rope or the strand decreases the apparent un-fused density, while increasing the thermal isolation and contributes to improved measurement results.

In a preferred embodiment, the intermediate layer is formed from glass fibers, preferably from E-glass. The basis of the glass, fibers can be silica ($SiO_2$), particularly with a melting point of up to 1200° C. E-glass is an industrial common material and one suitable for the purpose of the present invention, particularly ET91415TEXO, can be obtained from PPG industries Cheswick, Pa., USA. The TEX, the weight, of the preferred E-glass is 1420 (g/km)). The pre-fused density of glass fibers are useful thermal insulator guides because of their high ratio of surface area to weight. As fused, the density is low compared with the density of the molten steel bath so that the fluid glass fiber material in the molten steel bath will immediately flow upwards, away from the fiber, contributing to improved measurement results. The melting point and softening point of glass fibers is lower than 1600° C. and thus much lower than the temperature range of molten steel processes.

Preferably, the density of the intermediate layer has a melted and unmelted density. The un-fused density or unmelted density of for example, at least two fibers correspond to the weight of those at least two fibers divided by volume of those at least two fibers including the space in between them in a condition in which both fibers are not softened or melt. The fused density or melted density of, for example, the above-mentioned at least two fibers corresponds to the weight of those at least two fibers divided by volume of those at least two fibers fused together for example in form of a gob in a condition in which both fibers are softened or melt.

Preferably, the density or fused density of the material of the intermediate layer is less than 5 $g/cm^3$, preferably less than 4 $g/cm^3$, more preferably between 2.0 and 3.5 $g/cm^3$. Since the density of molten steel is much higher, the material of the intermediate layer will flow immediately upwards upon melting of the outer metallic layer. Thus, improved measurement results are possible.

Preferably, the ratio of the density of the liquid intermediate layer to that of the molten metal is between 0.25 and 0.45, and more preferably a ratio between 0.32 to 0.38. Since the intermediate layer is more or less a woven rope structure, it has a pre-melted density which is much less than its fused density and very insulative. The pre-melted density of the intermediate layer is 0.3 to 1.7 $g/cm^3$, and more preferably 0.4 to 1.0 $g/cm^3$.

Preferably, the pre-melted density is such that from the interface between the melted gob and the remaining unmelted intermediate layer is gas porous and permits the passage of combustion products of the intermediate layer in a direction opposite the fused intermediate layer material. Thus, improved measurement results are possible.

In a preferred embodiment, the intermediate layer is arranged between the metal tube and a tube formed from plastic wherein the optical fiber is within the plastic tube. Alternatively, cardboard can be used instead of plastic. Improved measurement results are possible, especially when the outer diameter of the optical fiber is smaller than the inner diameter of the plastic tube.

The preferred embodiment is a semi-tight buffer jacket, but a loose jacket is also acceptable. The general construction known to the art is either a 62.5/125 µm or alternately 50/125 µm graded index fiber placed in a 0.9 mm plastic tube in which the fiber is mechanically isolated from external forces. The material of the tube is generally plastic, and more specifically a polyamide, such as tradenames Nylon, or thermoplastic elastomers such as Hytrel or similar materials as disclosed in publication, "Innovative continuous online determination of steel melt temperature by direct optical measurement in the melt" T. Lamp, et al., Final Report EUR 21428, Contract no. 7210-PR/204, 2005, p 13-17. These plastics typically provide stiffening for the fiber against outside microbending influences. Suitable telecom optical fibers, as described, can be obtained from Huber and Sultrier AG, Degersheimerstrasse 14, CH-9100 Herisau D E. The plastic tube can be filled with moisture-resistant gel which provides additional mechanical protection and a water barrier layer around the fiber. This filling material is generally petroleum or silicone-based compounds.

In an alternate embodiment, the rope maybe comprised of a group of yarns or strands where several units of this grouping may be of a different chemical composition. Thus, the blending of yarns or strands of different chemical compositions can provide a simple manufacturing method of controlling the physical and chemical properties of, a rope with a uniform overall thickness from center to its overall outer diameter.

An alternate construction is 24 fiber strands with the 62.5/125 µm or alternately 50/125 µm graded index fiber with a 0.9 mm semi-tight tube arranged in the middle of a fiber bundle, Eight of the 16 fiber strands of the bundle are E-glass and 8 strands can be Ecomab, an alkali earth silicate (AES) material available from Keramab, Haverheidelaan 4,B9140 Temse, B E, with a melting point of approximately 1330° C. A typical composition of AES material consists of 50-82% silica, 18-43% calcia and or magnesia and less than 6% alumina, titania or zirconia and trace oxides. Wrapped about the bundle are an additional 8 more strands of E-glass. In total, 8 of 24 strands are AES, the balance of E-glass serving to lower the melting temperature of the mixed fibers. The density of the intermediate layer as constructed is particularly approximately 0.51 $g/cm^3$. The intermediate fiber layer is then preferably covered by a lap seam metal jacket tube of at least 50% Fe of approximately 1 mm.

In an alternate embodiment, the rope may be comprised of basalt fibers in its entirety or mixed with fibers of E-glass or AES to achieve the desired melting temperature and density.

Figure 1:
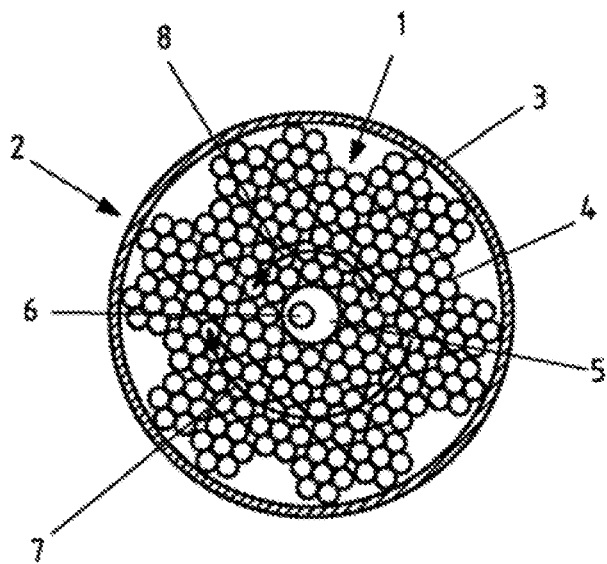
FIG. 1 is a cross-sectional view of an optical cored wire showing an intermediate layer of a rope-like form about a center optical fiber, in accordance with an embodiment of the present invention.

FIG. 1 shows a cross section of an optical cored wire 2 comprising an outer metal coat (i.e., metal jacket) 3, a plurality of strands 4, an inner plastic tube 5 (also called semi tight jacket), and, an optical fiber 6 within the plastic tube 5. The outer circumference of the optical fiber 6 is smaller than the inner diameter of the plastic tube 5. The strands 4 are volumized and formed from a plurality of E-glass fibers.

The strands 4 are twisted around the plastic tube 5 and form a rope. Alternate layers of strands are arranged in clockwise 7 and then counter clockwise 8 directions. The optical fiber 6 is in the center of the rope. The outer jacket is formed from low carbon steel.

Figure 2:
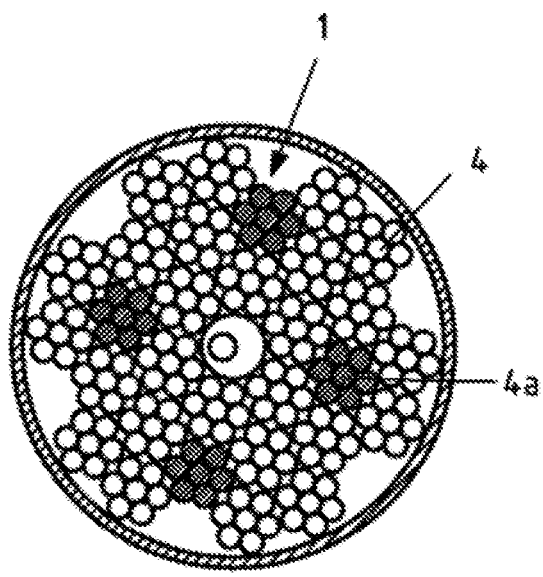
FIG. 2 is a cross-sectional view of an optical cored wire showing an intermediate layer of a rope-like form in which alternate material strands have been introduced to influence its physical properties about a center optical fiber, in accordance with an embodiment of the present invention.

FIG. 2 shows a cross section of an alternate optical cored wire 2 comprising an outer metal coat (i.e., metal jacket) 3, a plurality of strands 4 formed from E-glass, a plurality of strands of an alternate material 4a forming a mixture with the strands 4 formed from E-glass, an inner plastic tube 5 (also called semi tight jacket), and an optical fiber 6 within the plastic tube 5. The outer circumference of the optical fiber 6 is smaller than the inner diameter of the plastic tube 5. The strands 4 and 4a are volatilized and formed from a plurality glass fibers. The strands 4 and 4a are twisted around the plastic tube 5 and form a rope. Alternate layers of strands are arranged in clockwise and then counter clockwise directions. The optical fiber 6 is in the center of the rope. The outer jacket is formed from low carbon steel.

Figure 3:
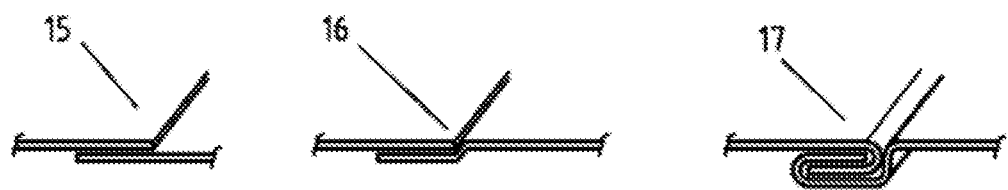
FIG. 3 shows possible closures of the outer tube known in the art.

FIG. 3 shows the profiles of preferred embodiments of a tube closure, a lap seam 15, alternatively a countersunk lap seam 16, and a grooved flat lock seam 17, which are known in the art and referenced to in the specification.

Figure 4:
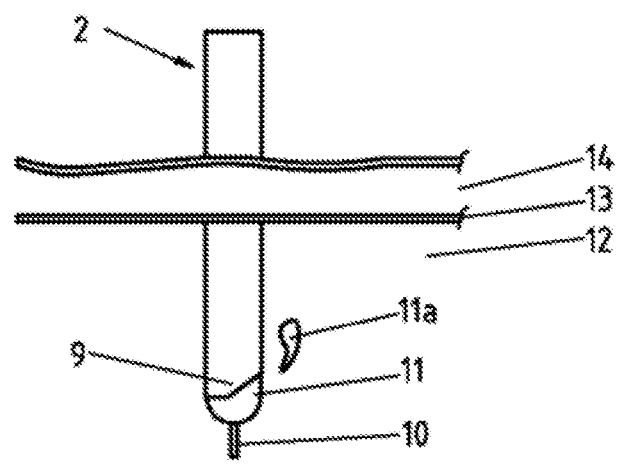
FIG. 4 is a cross-sectional view of molten steel within a vessel wherein a cored wire is immersed the molten steel.

FIG. 4 shows a cross section of the optical cored wire 2 immersed into molten metal 12. Due to the high temperature of the molten steel 12, material surrounding the optical fiber 2 is progressively melted 9 due to the above mentioned reasons. As a result, an optical fiber tip 10 protrudes from a gob of intermediate material 11 whose excess 11a floats away. After a measurement, the optical cored wire is allowed to fully melt back to the top surface of the liquid metal 13.

Figures 5, 6:
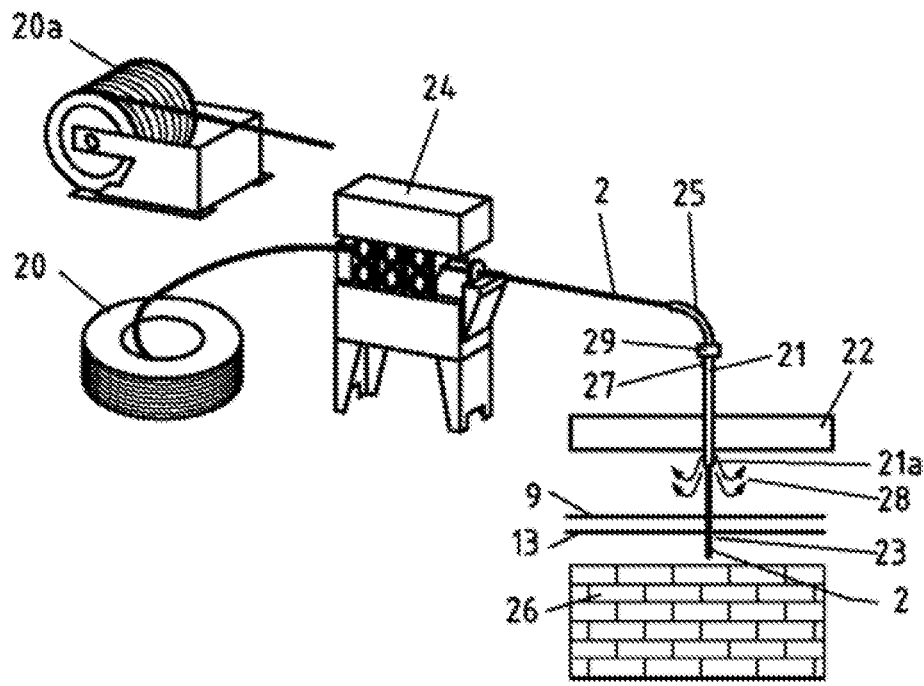
FIG. 5 is a system for measuring the temperature of molten steel.
FIG. 6 shows the composition of the E-glass.

As shown in FIG. 5, a cored wire 2, a graded index 62.5/125μ semi tight 0.9 mm jacket optical fiber with an intermediate layer (1) of low melting E-glass surrounded by a 1 mm metal steel outer layer closed by a lap seam comprising at least 50% Fe, is used on a cored wired feeding system. Alternatively, a graded index 50/125μ or 62.5/125μ loose jacket optical fiber can be used. The optical cored wire 2 maybe de-spooled from a sitting coil 20 or a roll stand 20a by a cored wire feeder 24 and pushed into a guide tube 25 connected to the inner passage of an immersion nozzle 21 by connector 29, such that optical fiber tip 10 reaches the measuring position 23. FIG. 5 depicts a metallurgical vessel with a roof 22 and a floor 26, but other melting vessels, molten metal transfer vessels or holding vessels are also applicable.

Starting from a location outside the vessel, the cored wire 2 is fed through the gas cooled immersion nozzle 21 installed in an upper vessel wall 22 where the exit opening 21a of nozzle 21 is within the interior of the vessel. The blowing lance 21 is a concentrically constructed tube within a tube. The cored wire is fed through the internal tube while air is fed through an attachment 27 into the annular space between the inner diameter of the outer tube and the outer diameter of the inner tube and exiting at a location 28 within the vessel. The absolute amount of cooling air should be chosen such to prevent slag closing off the lance outlet even when the furnace slag is foamed, and thus the outlet 21a will be within the slag layer 14. Although the location of the immersion nozzle 21 can be in a variety of positions, the essential installation principle is that the nozzle has a direct line access to the surface 13 of the molten steel 12 starting from a position above the molten steel bath.

FIG. 6 shows a preferred E-glass materials composition with 43 to 74 mol % $SiO_2$, 0 to 8.5 mol % $B_2O_3$, 6 to 10 mol % $Al_2O_3$, 0.5 to 9 mol % MgO, 15 to 28 mol % CaO, up to 2.5 mol % $Na_2O$, up to 0.05 mol % $K_2O$, up to 0.3 mol % $Fe_2O_3$, up to 1 mol % $TiO_2$ and/or up to 2 mol % F.

FIG. 7 shows a preferred fiber material chemical composition of Basalt rock for the intermediate layer (1) with about 52.8 mol % $SiO_2$, about 17.5 mol % $Al_2O_3$, about 10.3 mol % $Fe_2O_3$, about 4.63 mol % MgO, about 8.59 mol % CaO, about 3.34 mol % $Na_2O$, about 1.46 mol % $K_2O$, about 1.38 mol % $TiO_2$, about 0.28 mol % $P_2O_5$, about 0.16 mol % MnO and/or about 0.06 mol % $Cr_2O_3$.

FIG. 8 shows a diagram of viscosity over temperature of exemplary fiber materials for the intermediate layer (1). The very left curve refers to soda-lime glass and the adjacent curve to borosilicate glass. These materials are commonly "molten" or "fused," in the sense of the present application, at a viscosity of 10 to 10000 poise in a temperature range of about 1200 to 1400° C. Softening points of these materials are above 600° C.

Figure 9:
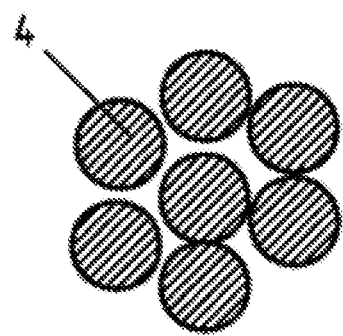
FIG. 9 is a cross-sectional view of a volumized strand of fibers.
Figure 10:
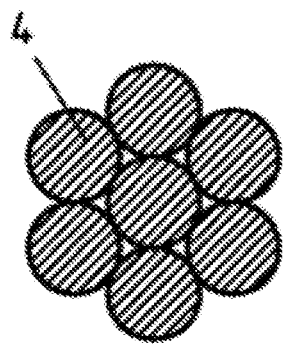
FIG. 10 is a cross-sectional view of a not-volumized strand of fibers.

FIGS. 9 and 10 show cross-sections of a strand which consists of a plurality of, for example, E-glass fibers 4. The strand shown in FIG. 9 is volumized. The strand shown in FIG. 10 is not volumized. For this reason, the pattern of the fibers 4 of FIG. 9 is less regular than the pattern of the fibers 4 of FIG. 10. Further, the volumized fibers 4 shown in FIG. 9 are less compact compared with the fibers 4 shown in FIG. 10.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A cored wire (2) comprising an optical fiber (6) and a cover laterally surrounding the optical fiber,
   wherein the cover surrounds the optical fiber in a plurality of layers, one layer comprising a metal tube (3) and an intermediate layer (1) arranged beneath the metal tube (3),
   wherein the intermediate layer (1) is formed from a material having a melting point of 600° C. to 1500° C., and
   wherein a rope forms the intermediate layer (1), the rope being volumized.

2. The cored wire (2) according to claim 1, wherein the material of the intermediate layer (1) has a melting point of 1000° C. to 1500° C.

3. The cored wire (2) according to claim 1, wherein the intermediate layer (1) is formed from fibers (4, 4a).

4. The cored wire (2) according to claim 3, wherein the fibers (4, 4a) are endless fibers.

5. The cored wire (2) according to claim 1, wherein the optical fiber (6) is arranged in a center of the rope.

6. The cored wire according to claim 1, wherein the intermediate layer (1) is formed from E-glass fibers.

7. The cored wire according to claim 1, wherein the intermediate layer (1) is arranged between the metal tube (3) and a tube (5) formed from plastic or cardboard, and wherein the optical fiber (6) is within the plastic or cardboard tube (5).

8. The cored wire according to claim 7, wherein an outer diameter of the optical fiber (6) is smaller than an inner diameter of the plastic or cardboard tube (5) so that the optical fiber (6) is moveable within the plastic or cardboard tube (5).

9. The cored wire according to claim 1, wherein the density of the material of intermediate layer (1) is less than 5 g/cm$^3$.

10. A cored wire (2) for measuring a temperature of a molten metal (12) comprising an optical fiber (6) and a cover laterally surrounding the optical fiber,
wherein the cover surrounds the optical fiber (6) in a plurality of layers, one layer comprising a metal tube (3) and an intermediate layer (1) arranged beneath the metal tube (3),
wherein a portion of the intermediate layer (1), the entire intermediate layer (1) and/or the cover laterally surrounding the optical fiber (6) can melt immediately upon immersion into the molten metal (12) or upon immediate exposure to the molten metal (12), and
wherein a rope forms the intermediate layer (1), the rope being volumized.

11. The cored wire (2) according to claim 10, wherein the cored wire (2) has an immersion side for immersion into the molten metal (12) and an opposite side, wherein the intermediate layer (1) is composed in such a way that the intermediate layer (1) is molten during immersion into the molten metal (12) at the immersion side and at the same time remains unmelted and/or porous at the opposite side.

12. The cored wire (2) according to claim 10, wherein the optical fiber (6) is arranged centrally in the cored wire (2) and/or covered by a tube (5) of plastic.

13. The cored wire (2) according to claim 10, wherein the intermediate layer (1) has a lower melting point than the molten metal.

14. The cored wire (2) according to claim 10, wherein the intermediate layer (1) is configured to form a gob (11) of molten intermediate layer (1) in a stationary condition surrounding the optical fiber (6) during measuring.

15. The cored wire (2) according to claim 10, wherein the intermediate layer (1) is configured to provide an unmelted density which is at least 30% higher than a melted density, wherein the unmelted density is defined as weight divided by porous structure volume and wherein the melted density is defined as weight divided by conglomerated molten material volume.

16. The cored wire (2) according to claim 15, wherein the melted density of the intermediate layer (1) corresponds to at least 15% of 7 g/cm$^3$ or common melted metal density.

17. The cored wire (2) according to claim 14, wherein an unmelted density of the intermediate layer (1) provides for open porosity behind the molten gob (11).

18. The cored wire (2) according to claim 14, wherein a rate of removal of the gob (11) of molten intermediate layer (1) from a surface of an optical fiber projection (10) depends on a density difference between the liquid gob (11) and the liquid molten metal (12).

19. The cored wire (2) according to claim 10, wherein the cored wire (2) or the metal tube (3) is not gas tight by inclusion of a lap seam (15), or wherein the cored wire (2) or the metal tube (3) is gas tight by the inclusion of a lock seam (16, 17).

20. The cored wire (2) according to claim 10, wherein the intermediate layer (1) is configured to provide an unmelted density which is at most 100% higher than a melted density, wherein the unmelted density is defined as weight divided by porous structure volume and wherein the melted density is defined as weight divided by conglomerated molten material volume.

21. The cored wire (2) according to claim 20, wherein the melted density of the intermediate layer (1) corresponds to at most 60% of 7 g/cm$^3$ or common melted metal density.

* * * * *